(12) United States Patent
Burgess et al.

(10) Patent No.: US 8,435,317 B2
(45) Date of Patent: May 7, 2013

(54) FINE GRAINED POLYCRYSTALLINE ABRASIVE MATERIAL

(76) Inventors: Anthony Roy Burgess, Johannesburg (ZA); Cornelius Johannes Pretorius, Sixmilebridge (IE); Gerrard Soobramoney Peters, Mondeor (ZA); Peter Michael Harden, Limerick (IE)

( * ) Notice: Subject to any disclaimer, the term of this patent is extended or adjusted under 35 U.S.C. 154(b) by 715 days.

(21) Appl. No.: 12/063,351

(22) PCT Filed: Aug. 16, 2006

(86) PCT No.: PCT/IB2006/002229
§ 371 (c)(1),
(2), (4) Date: Mar. 19, 2010

(87) PCT Pub. No.: WO2007/020518
PCT Pub. Date: Feb. 22, 2007

(65) Prior Publication Data
US 2010/0186304 A1    Jul. 29, 2010

(30) Foreign Application Priority Data

Aug. 16, 2005   (ZA) .................................. 2005/06534

(51) Int. Cl.
*B24D 3/02*      (2006.01)
*C09C 1/68*      (2006.01)
*C09K 3/14*      (2006.01)

(52) U.S. Cl.
USPC .............................................. 51/309; 51/307

(58) Field of Classification Search .................... 51/307, 51/309
See application file for complete search history.

(56) References Cited

U.S. PATENT DOCUMENTS

| | | | | |
|---|---|---|---|---|
| 5,011,514 A | * | 4/1991 | Cho et al. | 51/308 |
| 5,151,107 A | * | 9/1992 | Cho et al. | 51/308 |
| 6,372,346 B1 | * | 4/2002 | Toth | 428/403 |
| 6,987,318 B2 | * | 1/2006 | Sung | 257/720 |
| 2004/0175875 A1 | * | 9/2004 | Sung | 438/197 |
| 2005/0250250 A1 | * | 11/2005 | Sung | 438/122 |

FOREIGN PATENT DOCUMENTS

| | | |
|---|---|---|
| EP | 0 253 603 A | 1/1988 |
| EP | 0 714 695 A | 6/1996 |
| EP | 0 974 566 A | 1/2000 |
| JP | 8-225875 A | 9/1996 |
| JP | 2000-044347 A | 2/2000 |
| JP | 2000-044350 A | 2/2000 |
| JP | 2002-302732 A | 10/2002 |
| WO | WO 96/31305 A | 10/1996 |
| WO | WO 2005/061181 A | 7/2005 |
| WO | WO 2005/068113 A | 7/2005 |

OTHER PUBLICATIONS

Hubel, Roland et al.: "Characterization of Microstructural Inhomogeneity by Image Analysis", *Prakt. Metallogr.* 31, 1994, 7, pp. 327-337.
From, Anders et al.: "Analysis of Clustered Dispersions of Uncombined Carbon in Cemented Carbide", *Int. J of Refractory Metals & Hard Materials*, 14 (1996), pp. 393-405.
Vander Voort, George F.: *MiCon 90: Advances in Video Technology for Microstructural Control*, Copyright by ASTM Int'l 1991, ASTM Publication Code No. (PCN): 04-010940-23.
Missiaen, J.M. et al.: "The homogeneity of phase repartition in $TiB_2$-Fe composites using variance and covariance analysis", *Journal of Microscopy*, vol. 175, Pt. 3, Sep. 1994, pp. 195-204 with additional cover page.

* cited by examiner

*Primary Examiner* — Kaj K Olsen
*Assistant Examiner* — Ross J Christie
(74) *Attorney, Agent, or Firm* — Frommer Lawrence & Haug LLP; Ronald R. Santucci

(57) ABSTRACT

Polycrystalline diamond abrasive elements having a fine grained microstructure are produced from fine grained diamond particles and a catalyst solvent material, at least a portion of which is in the form of nanosized particles. The abrasive elements exhibit high homogeneity and exhibit significant increases in toughness and improved wear resistance.

8 Claims, No Drawings

FINE GRAINED POLYCRYSTALLINE ABRASIVE MATERIAL

This application is a 371 of PCT/IB2006/002229 filed on Aug. 16, 2006, published on Feb. 22, 2007 under publication number WO 2007/020518 A and claims priority benefits of South African Patent Application No. 2005/06534 filed Aug. 16, 2005, the disclosure of which is hereby incorporated by reference.

BACKGROUND OF THE INVENTION

This invention relates to polycrystalline diamond.

Polycrystalline diamond is the preferred material for the machining of various work pieces, rock drilling applications, and for use as wear parts. The benefits of this material include its superior hardness, diamond being the hardest material known to man, which results in its superior wear resistance. Superior wear resistance in turn imparts various benefits including increased tool or cutter life, less down time, superior work piece finish and performance in application, for example.

Due to the hardness of diamond, it is also brittle. This makes it unsuitable for many applications as it is susceptible to cracking. This inherent brittleness can be significantly reduced by making polycrystalline diamond (PCD), where fine grains of diamond are sintered together to form a polycrystalline structure containing a continuous inter-grown diamond network. In order to achieve diamond intergrowth, a catalysing material, known as a diamond catalyst/solvent, is typically present during synthesis. The catalyst/solvent is typically cobalt, nickel, iron or an alloy containing one or more such metals, preferably nickel and more preferably cobalt. The net result is a continuous diamond skeleton with the catalyst/solvent filling the interstices between the diamond grains. The PCD is generally made under elevated temperature and pressure conditions (HPHT) at which the diamond particles are crystallographically stable.

To further reduce brittleness, this polycrystalline diamond structure may be mounted onto a hardmetal substrate to form a polycrystalline diamond compact, thereby providing a platform behind the PCD, placing it under compression and significantly reducing failure due to brittleness. Hardmetal backed PCD tools offer significant machining and rock drilling benefits and are used extensively.

However, PCD tools are still too brittle for many applications.

SUMMARY OF THE INVENTION

According to one aspect of the invention, there is provided a polycrystalline diamond abrasive element comprising a fine grained polycrystalline diamond material and a second phase comprising catalyst/solvent for the diamond material, wherein the polycrystalline diamond material is characterised in that it has an average catalyst/solvent mean-free-path value of less than 0.60 µm, and a standard error for the catalyst/solvent mean-free-path that is less than 0.90.

The standard error for the catalyst/solvent mean-free-path is preferably less than 0.85.

The polycrystalline diamond material preferably has an average grain size of from about 0.1 to about 10.5 µm, more preferably from about 0.1 to about 6.5 µm, and most preferably from about 0.1 to about 2.0 µm.

According to another aspect of the invention, there is provided a composition for use in a method of producing a polycrystalline diamond abrasive element, the composition comprising diamond particles, wherein the diamond particles are fine grained, and a diamond catalyst/solvent for the diamond particles, wherein the catalyst/solvent comprises particles that are nanosized.

The catalyst/solvent is typically cobalt, nickel, iron or an alloy containing one or more such metals, preferably cobalt.

The diamond particles are typically submicron to micron sized particles, preferably having an average particle size of less than about 10.5 µm, more preferably less than about 6.5 µm, most preferably less than about 2.0 µm, and preferably having an average particle size of greater than 0.1 µm.

The catalyst/solvent preferably has an average particle size of less than about 800 nm, more preferably less than about 400 nm, most preferably less than about 100 nm, and an average particle size greater than about 10 nm.

The ratio of the average particle size of the catalyst/solvent to the average particle size of the diamond particles is preferably in the range of from about 1:10 to about 1:1000, more preferably in the range from about 1:100 to about 1:1000.

According to yet another aspect of the invention, a method of producing a polycrystalline diamond abrasive element includes the steps of creating an unbonded assembly by providing a substrate, placing a mass of diamond particles on a surface of the substrate, wherein the diamond particles are fine grained, providing a diamond catalyst/solvent for the diamond particles, wherein the catalyst/solvent comprises, at least in part, particles that are nanosized, and subjecting the unbonded assembly to conditions of elevated temperature and pressure suitable for producing a polycrystalline diamond layer of the mass of diamond particles.

The substrate will generally be a cemented carbide hardmetal.

The conditions of elevated temperature and pressure necessary to produce the polycrystalline diamond layer from a mass of diamond particles are well known in the art. Typically, these conditions are pressures in the range 4 to 8 GPa and temperatures in the range 1300 to 1700° C.

According to yet another aspect of the invention, there is provided a tool or tool insert comprising the polycrystalline diamond abrasive element as detailed above.

DETAILED DESCRIPTION OF PREFERRED EMBODIMENTS

The present invention concerns polycrystalline diamond abrasive elements and the manufacturing and use thereof. The method includes the steps of placing a mass of fine grained diamond particles and nanosized catalyst/solvent material on a surface of a substrate and subjecting the unbonded assembly to conditions of elevated temperature and pressure suitable for producing a polycrystalline diamond layer of the mass of diamond particles. The substrate will generally be a cemented carbide substrate. The cemented carbide support or substrate may be any known in the art such as cemented tungsten carbide, cemented tantalum carbide, cemented titanium carbide, cemented molybdenum carbide or mixtures thereof.

The conditions of elevated temperature and pressure necessary to produce the polycrystalline diamond layer from a mass of diamond particles are well known in the art. Typically, these conditions are pressures in the range 4 to 8 GPa and temperatures in the range 1300 to 1700° C. The abrasive element that is produced by the method of the invention will additionally have a binder material present. This binder will preferably be a catalyst/solvent for the ultra-hard abrasive particle used. Catalyst/solvents for diamond are well known in the art; and are preferably cobalt, nickel, iron or an alloy containing one or more of these metals. This binder can be introduced both through infiltration from the substrate into the mass of abrasive particles during the sintering treatment, and in particulate form as a mixture within the mass of abrasive particles. Typically, this binder will be present in an amount of 10 to 20% by mass, but this may be as low as 6% by mass. Some of the binder metal will generally infiltrate into the abrasive compact during compact formation.

The polycrystalline diamond abrasive element that is produced has a very fine diamond grain structure that is interspersed with the diamond catalyst/solvent. The polycrystalline diamond material is characterised by having an average catalyst/solvent mean-free-path value of less than 0.60 μm and a standard error for the catalyst/solvent mean-free-path of less than 0.90.

In a preferred embodiment of the invention the polycrystalline diamond material has a catalyst/solvent mean-free-path value of less than 0.55 μm.

In another preferred embodiment of the invention the polycrystalline diamond material has a catalyst/solvent mean-free-path value of less than 0.50 μm.

The standard error for the catalyst/solvent mean-free-path is preferably less than 0.85, and is typically greater than 0.70. In a preferred embodiment of the invention the standard error is in the range of 0.75 to 0.85.

In order to obtain a highly homogenous material, the catalyst/solvent particles that are mixed into the diamond powder mixture are preferably nanosized, more particularly having an average particle size of from about 10 to about 800 nm, more preferably from about 10 to about 400 nm, most preferably from about 10 to about 100 nm. The diamond particles are typically submicron to micron sized particles, preferably having an average particle size of from about 0.1 to about 10.5 μm, more preferably of from about 0.1 to about 6.5 μm, most preferably from about 0.1 to about 2.0 μm. The ratio of the average particle size of the catalyst/solvent to the average particle size of the diamond particles is chosen so that the ratio is preferably in the range of from about 1:10 to about 1:1000, and more preferably in the range from about 1:100 to about 1:1000.

The small size, typically in the nanosize region, of the catalyst/solvent particles admixed with the diamond particles enables the catalyst/solvent to be more readily deposited on the diamond particles as a coating or a film, where the catalyst/solvent is typically located in between the diamond particles in the form of pools. This permits a better uniform dispersion of the catalyst/solvent particles and the diamond particles in the polycrystalline diamond abrasive element, resulting in a more homogeneous structure.

By combining the very fine diamond particle size with a high degree of homogeneity, a polycrystalline diamond abrasive element is formed with a microstructure that exhibits a significant increase in toughness and a lower thermal diffusivity. The lower thermal diffusivity results in a lower conductivity, which facilitates improved temperature management at a cutting edge of the polycrystalline diamond abrasive element.

In materials science, toughness may be defined as the resistance provided by a material to crack propagation. In polycrystalline diamond abrasive materials, toughness is derived from both the size and the frequency of catalyst/solvent pools that a crack propagating through the material will encounter. By enhancing the homogeneity of the polycrystalline diamond abrasive element of the present invention (i.e. the distribution of diamond and catalyst/solvent material) to optimise either catalyst/solvent pool size or the number of catalyst/solvent pools that a crack in the polycrystalline diamond abrasive element will encounter, or both of these characteristics, the resistance of the material to crack propagation increases and hence the measured material toughness increases.

Localised diamond rich areas within the polycrystalline diamond abrasive element provide interconnected networks that allow rapid heat transfer around ferrous-metal rich areas with lower thermal conductivity. Improved homogeneity will therefore typically lower the thermal conductivity of the polycrystalline diamond abrasive material, allowing more heat to be retained at the cutting edge. A greater proportion of the heat generated during the machining operation is therefore available to be transferred to the swarf as it moves across the tool produced from the polycrystalline diamond abrasive material of the present invention, providing a more efficient thermal exchange cooling mechanism.

Conventional wisdom dictates that a higher thermal conductivity would allow heat generated at the point of contact between the polycrystalline diamond tool and the work piece to be more efficiently dispersed into the diamond tool, thereby decreasing the temperature of the cutting tool edge. While this argument is valid, it should be noted that the volume of the tool material is orders of magnitude smaller than that of the swarf it generates in the cutting operation. Hence, while higher conductivity increases dissipation of heat into the tool, after a short time it is possible to generate temperatures across the entire tool, that are high enough to result in thermal degradation of the cutting tool.

Thus, through careful manipulation of the microstructure, polycrystalline diamond abrasive elements of the present invention were obtained with beneficial properties that resulted in superior performance in application. In particular, the wear resistance of the material was found to be significantly improved over polycrystalline diamond abrasive material made using conventional methods.

Polycrystalline diamond abrasive elements of the present invention have particular application as tool inserts in the machining or working of both metal and wood, and as inserts for rock drilling. However, it will be appreciated that the applications of the polycrystalline diamond abrasive elements of the present invention are not limited to those listed above.

The extent to which a material's critical properties may be reproducibly and reliably predicted depends almost entirely on the homogeneity of the structure of the material. Assessment of homogeneity using image analysis is based on pattern recognition. Most of the methods used to generate a measure of material homogeneity have been applied to the analysis of low volume constituents, such as ceramic inclusions in steels. Published techniques of determining homogeneity include:

(i) Nearest neighbour distance [1]. When the nearest neighbour distribution of a given phase is determined, the results are compared to the mean and variance of the expected mean and variance for a random Poisson distribution;

(ii) Variance of area fraction [2, 3, 4];

(iii) Variance of the number of grains between analysed image fields [1, 2, 3, 4].

European patent EP 0 974 566 A1 [5] describes the use of metallurgical, scanning, transmission, and Auger electron microscopy to measure the thickness of the bonding phase in a cBN (cubic boron nitride) sintered body comprising cBN particles and a bonding phase that bonds the cBN particles. Direct measurement of the thickness of the bonding phase, by drawing an arbitrary straight line on the micrographs, and image analysis were used to determine the average and standard deviation values of the thickness of the bonding phase for a range of sintered materials.

In EP 0 974 566 A1 [5], the standard deviation of the thickness of the bonding phase is employed as a metric for evaluating the effectiveness of different material mixing methods. The lower the standard deviation, the more effective the mixing method was in homogeneously distributing the bonding phase.

It will be appreciated that the methods of analysis as mentioned above may also be applied to a material containing polycrystalline diamond.

In this invention, known methods were expanded upon, using image analysis to determine the average and standard deviation values for the catalyst/solvent mean-free-path of the polycrystalline diamond abrasive element. The catalyst/solvent mean-free-path can be determined as the thickness of the bonding phase as described in EP 0 974 566 A1 [5]. The standard error value ($\sigma_{STD}$) for the catalyst/solvent mean-free-path (MFP) is determined by dividing the standard deviation value, $\sigma$, by the overall average value. Lower standard error values will equate to higher homogeneity in the sintered materials.

The invention will now be described by way of the following non-limiting examples.

Examples

In order to produce sintered polycrystalline diamond abrasive elements according to the invention, a nanosized catalyst/solvent powder in the form of cobalt was milled in a planetary ball mill with milling media and solvent. For preparing batch sizes appropriate for the examples of the invention, typically 100 g powder mixtures, the catalyst/solvent powder was milled with approximately 150 g of milling media (4 mm WC/Co balls) and approximately 20 ml of solvent (ethanol). The fine cobalt was milled for about 1 hour to achieve high dispersion. The diamond and remaining milling media and solvent were then added, and the admixture was milled for approximately a further 8 hours. The milling media was screened out, and the slurry dried by evaporation. The examples of the invention are based on the composition recipes 1, 3 and 6 as listed in Table 1 below.

For comparative purposes, material mixtures were also prepared according to methods already known in the art where the admixed catalyst/solvent powder was far coarser in size. These were based on composition recipes 2, 4 and 5, as listed in Table 1.

TABLE 1

| Composition recipe | Ex 1 | Ex. 2 | Ex. 3 | Ex. 4 | Ex. 5 | Ex. 6 |
|---|---|---|---|---|---|---|
| Diamond (mass %) | 95 | 95 | 95 | 97.5 | 85 | 95 |
| Average diamond particle size (µm) | 1 | 1 | 2 | 2 | 2 | 5 |
| Catalyst/solvent (mass %) | 5 | 5 | 5 | 2.5 | 15 | 5 |
| Average catalyst/solvent particle size | 50 nm | 1 µm | 125 nm | 1 µm | 1 µm | 125 nm |

(Note that in some cases the final mixture will contain trace amounts of milling media, such as tungsten carbide, which are introduced inadvertently during the milling or powder processing steps. Hence the diamond and catalyst/solvent contents of the final mixture may differ slightly from that stated in Table 1.)

The catalyst/solvent used in the above compositions was cobalt. However, it will be appreciated that other suitable catalyst/solvents as described above, may be used.

In each case, the diamond catalyst/solvent powder mix of compositions 1 to 6, was then placed onto a tungsten carbide and cobalt hard metal substrate and sintered at conditions of elevated temperature and pressure necessary to produce the polycrystalline diamond material. Typically, these conditions are pressures in the range 4 to 8 GPa and temperatures in the range 1300 to 1700° C.

In order to determine the homogeneity of the sintered polycrystalline diamond abrasive elements, the average value and standard deviations for the cobalt mean-free-path measurements of these polycrystalline diamond abrasive elements were assessed. The individual values for the samples prepared from each composition type are shown in Table 2. The standard error value ($\sigma_{STD}$) as mentioned above, provides a representative figure of merit describing the homogeneity of the microstructure. Clearly, a lower value will indicate a more homogeneous microstructure.

TABLE 2

| Sample | Ex. 1 | Ex. 2 | Ex. 3 | Ex. 4 | Ex. 5 | Ex. 6 |
|---|---|---|---|---|---|---|
| Co MFP average, (µm) | 0.27 | 0.23 | 0.31 | 0.38 | 0.52 | 0.56 |
| Co MFP $\sigma$, (µm) | 0.22 | 0.26 | 0.25 | 0.33 | 0.51 | 0.46 |
| $\sigma_{STD}$ | 0.81 | 1.13 | 0.81 | 0.90 | 0.98 | 0.82 |

The enhanced homogeneity of the polycrystalline diamond abrasive elements of the invention yielded significant increases in both the toughness and strength properties of the PCD material. The substantial improvements made to these critical properties, notably PCD toughness, were shown to provide considerable performance advantages in application testing. A summary of representative performance results is shown in Tables 3 and 4, below. (The comparative examples are shaded). In each case, the performance of an example of the invention is measured relative to a comparative example e.g. example 1 was observed to be 2.71 times as wear resistant as comparative example 2 when turning 18% SiAl.

TABLE 3

| Application | Performance Criteria | Ex. 1 | Ex. 2 |
|---|---|---|---|
| Turning 18%SiAl | Wear resistance | 2.71 | 1 |
| Milling 18%SiAl | Chip resistance | 1.46 | 1 |
| Turning Ti6Al4V | Wear resistance | 2.86 | 1 |

TABLE 4

| Application | Performance Criteria | Ex. 4 | Ex. 5 | Ex. 6 |
|---|---|---|---|---|
| Turning 18%SiAl | Wear resistance | 1.63 | 1.08 | 1.00 |
| Milling 18%SiAl | Chip resistance | 1.17 | 1.06 | 1.00 |
| Turning Ti6Al4V | Wear resistance | 1.48 | 1.10 | 1.00 |

The invention claimed is:

1. A polycrystalline diamond abrasive element comprising a polycrystalline diamond material having an average grain size of from 0.1 µm to 10.5 µm, and a second phase comprising catalyst/solvent for the diamond material, the polycrystalline diamond material having an average catalyst/solvent mean-free-path value of less than 0.60 µm and a standard error of less than 0.90, wherein the catalyst/solvent and the diamond material form a homogeneous structure in the polycrystalline diamond material, and the second phase is formed, at least in part, from particulate catalyst/solvent material having an average particle size of from about 10 nm to about 800 nm.

2. An abrasive element according to claim 1, wherein the standard error for the catalyst/solvent mean-free-path is less than 0.85.

3. An abrasive element according to claim 1, wherein the particulate catalyst/solvent material has an average particle size of from about 10 nm to about 400 nm.

4. An abrasive element according to claim 3, wherein the particulate catalyst/solvent material has an average particle size of from about 10 nm to about 100 nm.

5. An abrasive element according to claim 1, wherein the polycrystalline diamond material has an average grain size of from about 0.1 to about 6.5 µm.

6. An abrasive element according to claim 5, wherein the polycrystalline diamond material has an average grain size of from about 0.1 to about 2.0 µm.

7. An abrasive element according to claim 1, wherein the catalyst/solvent is selected from the group consisting of cobalt, nickel, iron and alloys containing one or more such metals.

8. An abrasive element according to claim 7, wherein the catalyst/solvent is cobalt.

\* \* \* \* \*